Patented July 28, 1931

1,816,281

UNITED STATES PATENT OFFICE

HANS JOSEF EMMER, OF MANNHEIM, GERMANY, ASSIGNOR TO GENERAL ANILINE WORKS, INC., OF NEW YORK, N. Y., A CORPORATION OF DELAWARE

PRODUCTION OF DIBENZANTHRONE

No Drawing. Application filed May 23, 1928, Serial No. 280,122, and in Germany June 23, 1927.

When dibenzanthrone is produced by fusing benzanthrone with caustic alkalies, according to the U. S. Patent No. 818,992, the yield is substantially smaller than the theoretical, owing to the formation of by-products.

I have now found that the yield of dibenzanthrone is considerably improved if the alkali melt be prepared in the presence of aldehydes or their polymerization products, or of such compounds as yield aldehydes under the conditions of working. Substances which are particularly suitable in accordance with the present invention are the aldehyde compounds of sulfoxylic acid and sulfurous acid, as for example, sodium-formaldehyde sulfoxylate, zinc-formaldehyde sulfoxylate, zinc-acetaldehyde sulfoxylate, sodium-formaldehyde-bisulfite, sodium-glyoxal bisulfite, sodium-benzaldehyde-bisulphite and the like. The increased yield, generally speaking, is accompanied by improved purity of the crude dyestuff.

The following examples will further illustrate the nature of the said invention, which however is not restricted thereto. The parts are by weight.

Example 1

A mixture of 100 parts of crude benzanthrone and 15 parts of paraformaldehyde is uniformly introduced, in the course of about an hour, while vigorously stirring, into a melt of 300 parts of 90 per cent caustic potash and 20 parts of anhydrous sodium acetate at a temperature of about 195 to 200° C. The temperature of the melt is then raised to 230° C., at which temperature the mass is stirred for another hour, the subsequent treatment being that already known and usually adopted.

Example 2

A mixture of 100 parts of crude benzanthrone and 20 parts of sodium-formaldehyde-bisulfite is uniformly introduced in the course of an hour, assisted by stirring, into a melt of 200 parts of 90 per cent caustic potash and 14 parts of anhydrous sodium acetate at a temperature of about 205° to 210° C., the temperature being then raised to about 220° to 225° C. and the stirring continued at that temperature for about 1 to 1½ hours longer. The subsequent treatment is carried out in the manner already known and usually adopted.

The sodium-formaldehyde-bisulfite may be replaced by the bisulfite compounds of other aldehydes, such as sodium-glyoxal bisulfite, sodium-benzaldehyde-bisulfite and the like.

Example 3

A mixture of 100 parts of crude benzanthrone and 20 parts of sodium-formaldehyde-sulfoxylate is uniformly introduced, while stirring, in the course of an hour, into a melt of 200 parts of 90 per cent caustic potash and 14 parts of anhydrous sodium acetate at a temperature of about 200° to 210° C., the temperature being then raised to 220° to 225° C. and stirring continued at that temperature for a further 2 hours. The subsequent treatment is carried out in the manner already known and usually adopted.

Similar action to that of sodium-formaldehyde sulfoxylate is exerted by other aldehyde compounds of sulphoxylic acid, such for example as zinc-formaldehyde sulfoxylate, zinc-acetaldehyde sulfoxylate and the like.

What I claim is:—

1. A process for the production of dibenzanthrone which consists in treating benzanthrone with fused caustic alkali in the presence of a compound selected from the group consisting of aldehydes, their polymerization products and substances yielding aldehydes, under the conditions of working.

2. A process for the production of dibenzanthrone which consists in treating benzanthrone with fused caustic alkali in the presence of a compound selected from the group consisting of formaldehyde, its polymerization products and substances yielding formaldehyde under the conditions of working.

3. A process for the production of dibenzanthrone which consists in treating benzanthrone with fused caustic alkali in the presence of a compound selected from the group consisting of formaldehyde bisulfites and formaldehyde sulfoxylates.

4. A process for the producing of dibenzanthrone which comprises treating benzanthrone with fused caustic alkali in the presence of sodium formaldehyde sulfoxylate.

In testimony whereof I have hereunto set my hand.

HANS JOSEF EMMER.